June 3, 1930.  J. NORTHCUTT  1,761,639
VEGETABLE KNIFE
Filed March 23, 1927
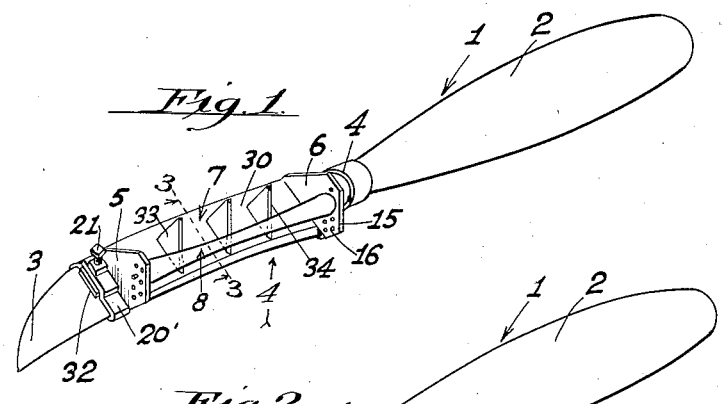
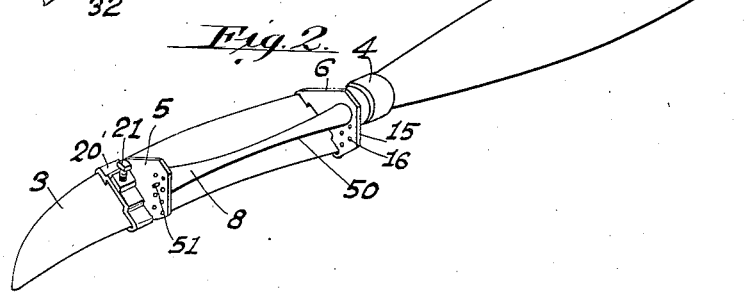
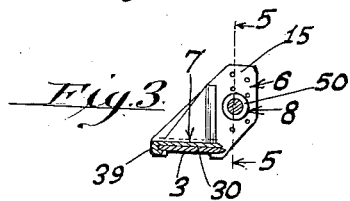
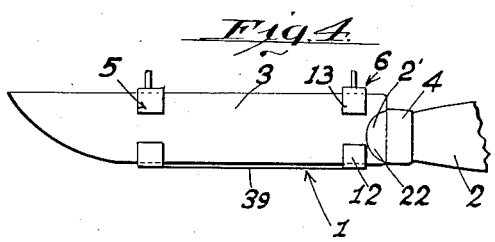
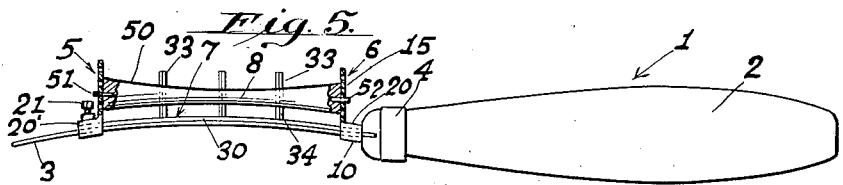
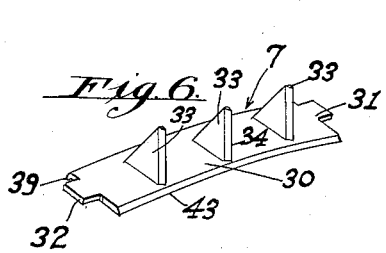
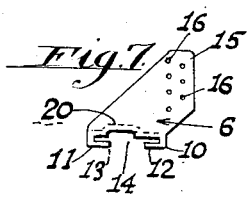
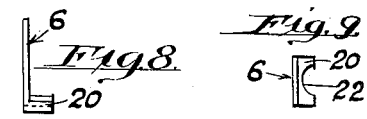
Inventor
Jacob Northcutt
by Hazard and Miller
Attorneys.

Patented June 3, 1930

1,761,639

UNITED STATES PATENT OFFICE

JACOB NORTHCUTT, OF HUNTINGTON BEACH, CALIFORNIA

VEGETABLE KNIFE

Application filed March 23, 1927. Serial No. 177,774.

This invention relates to kitchen utensils and more particularly to a vegetable knife that is adapted to peel, cut, slice or otherwise treat vegetables such as potatoes, carrots, turnips, beets or the like.

An object of my invention is to provide a knife which will successfully peel vegetables and slice them to a predetermined degree of thickness.

A further object of my invention is to provide a knife of the conventional type having an attachment removably mounted thereon so that the same may selectively be used to peel, slice or cut into squares, vegetables.

A still further object of my invention is to provide a device which may readily attach to any kitchen knife, which is extremely simple in its construction, yet operates efficiently, is inexpensive to manufacture, and is well adapted to perform the services required of it.

With the foregoing and other objects in view which will be made manifest in the following detailed description and specifically pointed out in the appended claims, reference is had to the accompanying drawings for an illustrative embodiment of the invention, wherein:

Figure 1 is a perspective view of my device showing it assembled to slice vegetables into elongated strips of a predetermined size.

Figure 2 is a similar perspective view showing the device set to perform either the peeling or slicing operation.

Figure 3 is a sectional view taken substantially along the line 3—3 of Figure 1.

Figure 4 is a view of the actual knifeblade showing the manner of connecting the knife attachment thereto. The direction of view is indicated by the arrow 4 of Figure 1.

Figure 5 is a sectional view taken along the line 5—5 of Figure 3.

Figure 6 is a perspective view of one of the elements of my device.

Figure 7 is a side elevation of another of the elements forming a part of my knife attachment.

Figure 8 is a side view of the element of Figure 7.

Figure 9 is a top view of the element shown in Figure 7.

Referring to the accompanying drawings wherein similar reference characters designate similar parts throughout, a kitchen knife is illustrated at 1 and comprises a handle 2, a blade 3, and a bezel 4. This knife may be of any conventional type, and I lay no claim as to the novelty of design or shape of the handle or bezel, as the same may be purely conventional; but I prefer the blade to be so formed that it is longitudinally arcuate.

My knife blade attachment consists of four pieces designated at 5, 6, 7 and 8 respectively. The pieces 5 and 6 are side pieces, the piece 7 is a bottom piece adapted to closely overlie the knife blade, and accordingly similarly longitudinally arcuate, and the piece 8 is a guiding roller. The end piece 6 clearly shown in Figure 7, is formed of flat sheet material, bent as at 10 and 11 to form opposed, retaining arms 12 and 13 respectively, defining a slot 14 in which the blade 3 of the knife is slidable. An upwardly extending side portion 15 has a plurality of staggered apertures 16 therethrough. The lower edge of this upwardly extending piece 15, is provided with a flange 20, from which the retaining arms 12 and 13 are bent. The flange 20, together with the elements 12 and 13 defining the slot 14, forms in effect a collar from which the side 15 extends upwardly. The piece 5 is identical in construction with the piece 6, with the exception that a small set-screw 21 is threaded through the flange 20' and is adapted to bear against the knife blade to hold the piece 5 in position thereupon. If desired, the flange 20 of the side piece 6, may be provided with a cut-out portion designated at 22, designed to bear against the rounded edge 2' of the handle 2. The element 7 consists of a sheet metal base 30, arcuate longitudinally, having lugs 31 and 32 on its ends, and a plurality of upstanding blades 33 having cutting edges 34. A downwardly extending flange is designated by the reference character 39, and the width of this flange is approximately the thickness of the back of the knife. The lugs 31 and 32 are adapted to be inserted in the slots 14, together with the knife blade, and the base 30 lies flat upon the surface of the knife blade, with the flange 39 serving to hold the same in position as shown in Figure 4. A suitable roller 50, having a surface complementary in shape to the arcuate surface of the knife blade, has a pair of pins 51 and 52 extending from either end thereof. This roller is adapted to be disposed between the pieces 5 and 6 in selected position by positioning the pins in the selected apertures 16. The staggered arrangement of these apertures enables the roller to be adjustable with respect to its distance from the cutting edge of the blade. The operation of my device is as follows:

When it is desired to peel vegetables or the like, the pieces 5 and 6 are inserted on the knife in the manner shown in Figure 1. The piece 6 bears directly against the end of the handle 2, and the cut-out portion 22 fits against the rounded portion 2' of the knife handle as shown in Figure 4. The pin 52 in the roller 50 is then inserted in one of the apertures in the piece 6 adjacent the edge of the knife, the particular aperture employed depending upon the thickness to which the vegetable is to be peeled. The piece 5 is then inserted on the knife and slid towards the roller until the pin 51 extends in a corresponding aperture in the side piece 5. The set-screw 21 is then adjusted so that it bears against the knife blade, and the device is thus assembled for peeling. The edge of the knife blade 3 serves to peel the vegetable, and the roller 50 acts as a guiding means to prevent peeling to too great a degree of thickness. The arcuate shape of the knife facilitates an even peeling of the vegetable. After the vegetable has been peeled, it may be desired to slice it and in this event the set-screw 21 is loosened, pieces 5 and 6 are moved away from each other, and the piece 7 is inserted on the knife as clearly shown in Figure 1, with the lugs 31 and 32 extending in the slots 14. The pieces are again brought towards each other, and the roller is inserted in a pair of apertures adjacent the top of the pieces 5 and 6. In this condition, the device is assembled for slicing. The edge of the blade 3, together with the sharpened portion 43 of the base plate 30, and with the sharp edges 34 of the blades 33, serve as cutting mediums. The vegetable passes between the roller and the knife blade, and is thus cut into three pieces with each stroke of the knife, and in a comparatively short time the vegetable is completely sliced. If smaller slices are desired, the roller may be inserted in apertures more remote from the top of the pieces 5 and 6, as desired.

I do not desire to limit myself to the exact arrangement and construction of parts illustrated in the accompanying drawings and described in this specification. My device may be used for slicing all kinds of fruit and vegetables, cheese and other edibles, and I contemplate modifying my invention in different ways. For example, it is not necessary to employ the use of the roller 50 as shown, for I contemplate employing the use of any guiding means. Only in so far as I have specifically pointed out my invention and limit myself in the appended claims do I desire to be limited.

It will be understood that various changes in the detail of construction may be made without departing from the spirit or scope of the invention as defined by the appended claims.

I claim:

1. An attachment for knife-blades comprising in combination a pair of collars adapted to be inserted on said knife, side pieces extending from said collars, a roller pivoted to said side pieces and extending therebetween, a plate disposed between said side pieces, and a blade extending upwardly from said plate.

2. A knife comprising in combination a handle and a blade, said blade being longitudinally arcuate, and a roller having a surface complementary to said blade and mounted in spaced relation therefrom.

3. A knife comprising in combination a handle and a blade, said blade being longitudinally arcuate, a pair of collars adapted to be inserted on said knife blade, side pieces extending upwardly from said collars, a guard between said side pieces, a plate disposed between said side pieces and bearing against said knife, and a plurality of blades extending upwardly from said plate to points above the bottom of said guard.

4. A knife comprising in combination a handle and a blade, said blade being longitudinally arcuate, a pair of collars adapted to be inserted on said blade, side pieces extending upwardly from said collars and having staggered apertures therein, a roller removably pivoted in said apertures and extending between said side pieces, a plate mounted on said blade between said side pieces and a plurality of blades extending upwardly from said plate to points above the bottom of said roller, said blades being perpendicular to said roller, said plate having lugs adapted to extend into said collars, whereby the plate may be held in position.

5. A knife comprising in combination, a handle and a blade, a pair of collars adapted to be inserted on said blade, side pieces extending upwards from said collars, a roller mounted for free rotation on said side pieces and extending therebetween, means for varying the distance between said roller and said blade, a plate mounted on said blade, lugs carried by said plate and extending into recesses in the collars to hold the plate in position, and a plurality of blades extending upwards from said plate to points above the bottom of said roller.

6. In combination with a knife blade, a guard disposed in spaced parallel relation to the edge of the blade serving to limit the thickness of a slice that may be cut by the knife blade, and a series of knives extending outwardly from the knife blade and arranged behind the guard for cutting up the slice.

7. In combination with a knife blade, a roller disposed in spaced parallel relation to the edge of the blade serving to limit the thickness of a slice that may be cut by the knife blade, and a series of knives extending outwardly from the knife blade and arranged behind the roller for cutting up the slice.

In testimony whereof I have signed my name to this specification.

JACOB NORTHCUTT.